ate of Patent: Jun. 30, 1987

United States Patent [19]
Omoda et al.

[11] Patent Number: 4,677,547
[45] Date of Patent: Jun. 30, 1987

[54] VECTOR PROCESSOR

[75] Inventors: Koichiro Omoda, Sagamihara; Shigeo Nagashima, Hachioji, both of Japan

[73] Assignee: Hitachi, Ltd., Tokyo, Japan

[21] Appl. No.: 570,244

[22] Filed: Jan. 12, 1984

[30] Foreign Application Priority Data

Jan. 12, 1983 [JP] Japan ............................ 58-2221

[51] Int. Cl.⁴ .......................................... G06F 9/00
[52] U.S. Cl. ............................................. 364/200
[58] Field of Search ... 364/200 MS File, 900 MS File

[56] References Cited

U.S. PATENT DOCUMENTS

| | | | |
|---|---|---|---|
| 4,128,880 | 12/1978 | Cray, Jr. ................ | 364/200 |
| 4,240,139 | 12/1980 | Fukuda et al. ........... | 364/200 |
| 4,293,941 | 10/1981 | Muraoka et al. ......... | 364/200 |
| 4,319,322 | 3/1982 | Allain et al. ............ | 364/200 |
| 4,525,778 | 6/1985 | Cane ..................... | 364/200 |
| 4,541,046 | 9/1985 | Nagashima et al. ....... | 364/200 |

Primary Examiner—Eddie P. Chan
Assistant Examiner—Christina M. Eakman
Attorney, Agent, or Firm—Antonelli, Terry & Wands

[57] ABSTRACT

At the point of time at which a segment base address is generated in current loop processing, a segment address displacement for use in the next loop processing is calculated in advance and held in one of a plurality of address registers, thereby to shorten the period of time required for address generation and to permit an overlap in the loop processing. Besides, in order to permit an overlapping in the loop processing even in a case where address registers of identical number are shared for effective utilization among different instructions, (n+1) groups of address registers are provided, and the overlapping of operations can be realized among the n successive loop processings.

5 Claims, 13 Drawing Figures

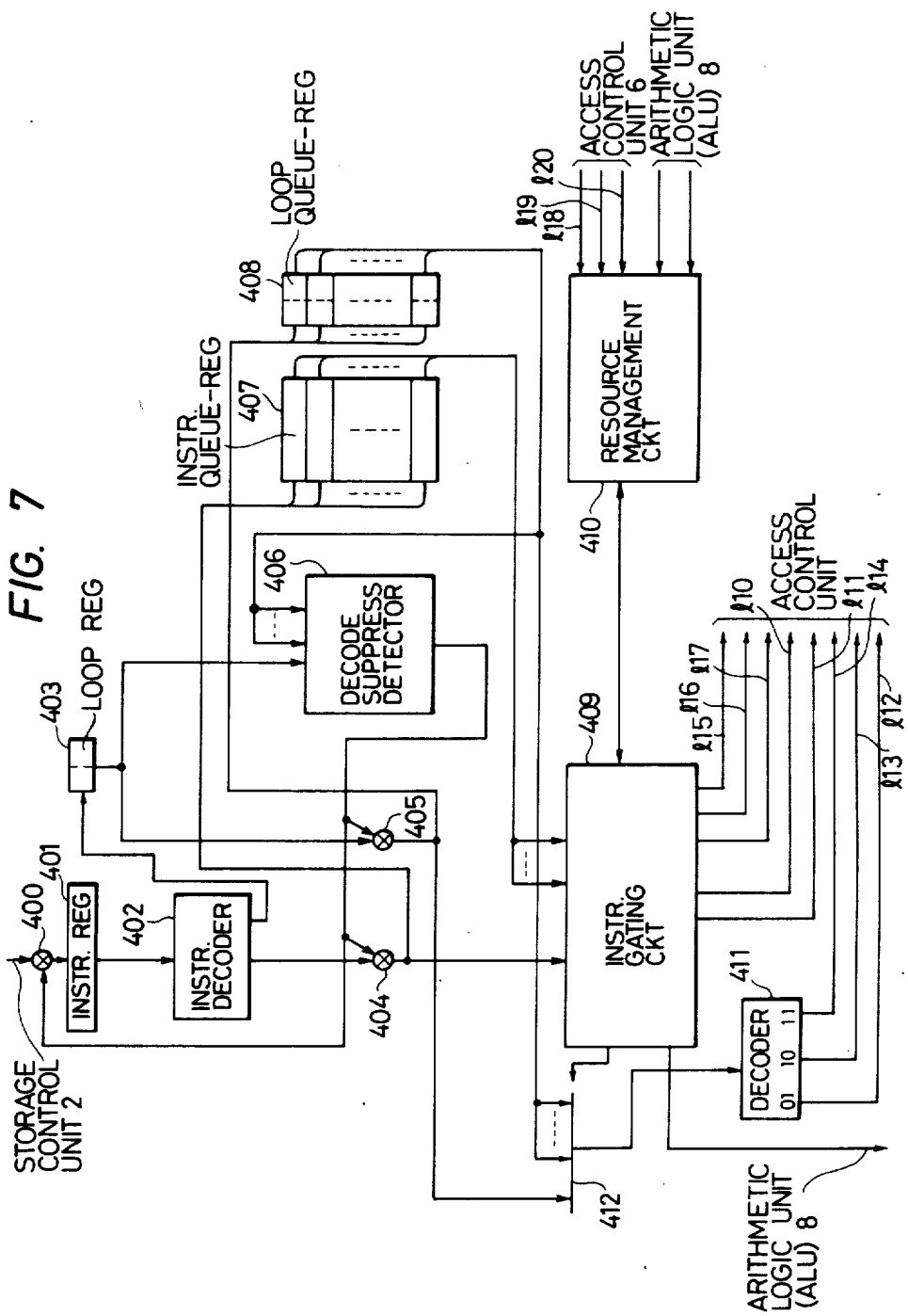

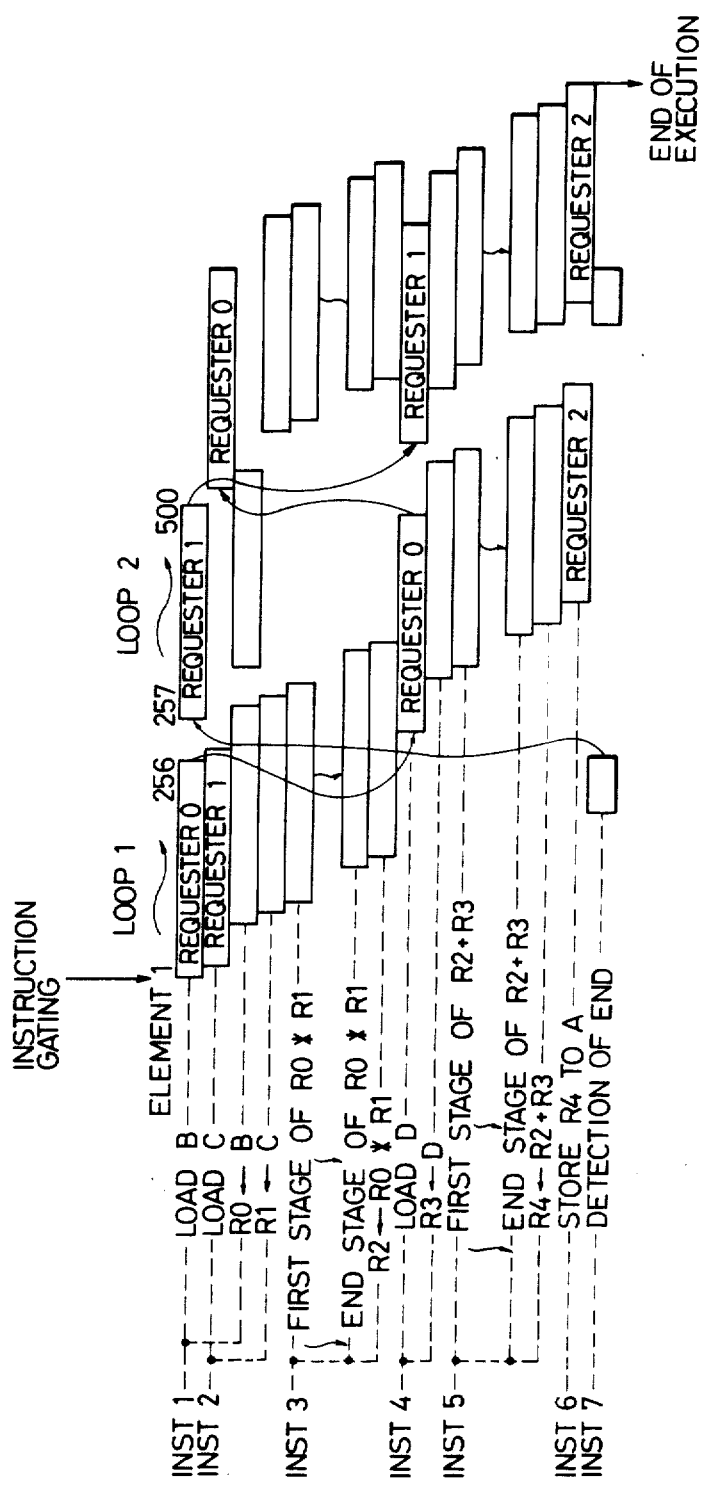

```
 ┌→INST 1    LVR     VR0    VAR1  VBR1
 │ INST 2    LVR     VR1    VAR2  VBR2
 │ INST 3    VMLT    VR2    VR0   VR1
 │ INST 4    LVR     VR3    VAR1  VBR3
 │ INST 5    VADD    VR4    VR2   VR3
 │ INST 6    STVR    VR4    VAR1  VBR4
 └─INST 7    END
```

VECTOR PROCESSOR

BACKGROUND OF THE INVENTION

The present invention relates to a vector processor capable of executing a vector operation at high speed, and more particularly to a vector processor which efficiently processes a vector operation having more elements than vector elements storable in vector registers.

FIG. 1 shows the situation for a vector operation in a prior-art vector processor which has a plurality of vector registers. In the figure, numeral 1 designates a main storage unit, numeral 7 a vector register unit, and numeral 8 an arithmetic logic unit.

When a load instruction is executed, vectors X and Y are fetched from the main storage unit 1, and they are stored in vector registers VR0 and VR1, respectively. Then, when a vector operation instruction is executed, the contents of the VR0 and VR1 are fetched and inputted to the arithmetic logic unit 8, in which an assigned operation is performed, the operated result being stored in a vector register VR2. Further, when a store instruction is executed, the content of the vector register VR2 is stored as a vector Z in the main storage unit 1. Here, k represents the number of elements of a vector to be processed (called the "vector length"), and l represents the number of vector elements storable in a single vector register (hereinbelow, called the "vector register length").

The vector length k differs widely depending upon the programs, and in general, it can reach 10 to 10000 or more. On the other hand, the vector register length l has its upper limit determined by restrictions in the hardware of the processor to be used, and it ranges from 64 to 256 in the present situation.

Therefore, for k <l, all necessary processing can be completed with one vector operation, whereas for k >l, more than one vector operation is required. In this situation, the following two methods are considered.

The first method is to divide the processing into units by software and to process the respective processing units independently by hardware.

The second method is the direct processing by hardware, in which the vector data is divided into groups each consisting of at most l elements and the individual groups are then processed. The l elements shall hereinbelow be referred to as a "segment". That is, in this method, after one segment has been processed by a vector instruction series, the vector instruction series is fetched again so as to process the next segment.

Owing to the hardware control, the latter method has the advantages that the overhead can be curtailed and that fast processing is permitted.

In the latter processing method, it is important to enhance the speed of processing wherein, after the processing of the vector instruction series for a certain segment (hereinbelow, this shall be called "loop processing" and "loop i" shall signify the loop processing for the i-th segment), addresses concerning the segment for use in the next loop processing are obtained.

Such an address updating method is described in "PROCESSING VECTORS AS A PLURALITY OF SEGMENTS" (IBM Technical Disclosure Bulletin, Vol. 13, No. 12, May 1971). This publication teaches the address updating method, but it does not disclose a circuit which execute operations in pipeline fashion by the use of vector registers as shown in FIG. 1.

FIG. 2A is a schematic block diagram of the known art, while FIG. 2B is a diagram of the general processing flow thereof.

In the case of accessing (load and store) a main storage unit 1, the load addresses (or store addresses) of respective elements are successively generated on the basis of a head address (the address of the first element and termed the "base address") and an address interval (hereinbelow, termed the "increment value") between the adjacent elements, whereupon the main storage unit is accessed on the basis of the generated addresses. Hereinbelow, a case where the vector data is arranged in the main storage unit 1 without any vacancy between the adjacent elements, namely, with all the elements being continuous, shall be called an "address continuation" condition, while the other case shall be called an "address discontinuation" condition. Assuming that the increment value is assigned in byte amounts, the address continuation condition holds for an increment value of 8 when the width of the vector data is 8 bytes, and it holds for an increment value of 4 when the width of the vector data is 4 bytes. Here, the vector register length is assumed to be 256.

First of all, the base address is set in base register 105, the increment value is set in an increment register 101, and a countup register 102 is reset to zero.

In a segment base register 109, the addresses of the head elements of segments to which respective loop processings are directed are set as stated below. Such address shall hereinbelow be called the "segment base address". In addition, the address displacement from the address of the head element of the vector data to a certain segment base address shall hereinbelow be called the "segment address displacement".

The countup register 102 retains the head element number in each loop processing.

Accordingly, the segment base address is found by adding the value of the base register 105 to the product between the value of the increment register 101 and that of the countup register 102. A method of calculating the product includes the following two cases.

The first case is the case of the address continuation condition. The value of the countup register 102 is inputted to a leftshift register 104, in which for 8-byte data the value is shifted leftwards by 3 bits, or for 4-byte data the value is shifted leftwards by 2 bits. The resulting output is set in an address register 107 through a selector 106.

The second case is the case of the address discontinuation condition. In this case, the product between the value of the increment register 101 and that of the countup register 102 is calculated by a multiplier 103, and the result is set in the address register 107. In either case, the contents of the address register 107 and the base register 105 are added by an adder 108, whereby the segment base address is obtained. An increment decoder 100 detects the address continuation/discontinuation condition, and controls the selector 106 on the basis of the detected result.

The countup register 102 needs to increase by the vector register length for the next loop processing. As shown in FIG. 2B by way of example, the updating of this register 102 is done at the last step of a instruction series which begins with a load instruction and ends in a store instruction. Further, since the multiplication in the multiplier 103 requires a considerable time for the address discontinuation condition, there is the problem that the starting point at time c of a load instruction in a loop 2 becomes late.

Regarding some contents of processing, it is desired to perform the processing with the starting time c of the load instruction of the loop 2 preceding the starting time b of the store instruction of the loop 1 in FIG. 2B, in other words, it is desired to overlap the instruction starting times between the processing loops. With the prior art, however, the countup register 102 is updated for the next loop processing at the last step of the preceding loop processing and the address is generated by the use of the value of the countup register 102 as stated before, so that overlap processing has been impossible with this prior art system.

SUMMARY OF THE INVENTION

It is accordingly an object of the present invention to eliminate the problems of the prior art described above, and to provide a vector processor which shortens the period of time required for address generation for the next loop processing and further overlaps the starting points of time of instructions between loop processing, thereby permitting enhancement of the speed of a vector operation.

In order to accomplish this object, according to the present invention, at the point of time at which a segment base address is generated in the preceding loop processing, a segment address displacement for use in the next loop processing is calculated in advance and held in one of the address registers, thereby to shorten the period of time required for address generation and to permit an overlap between the loop processing operations. Besides, in order to permit an overlapping among the loop processing operation even in a case where address registers of identical number are shared for effective utilization among different instructions, (n+1) groups of address registers are provided, and overlapping can be realized among the n successive loop processing operations.

BRIEF DESCRIPTION OF THE DRAWINGS

FIG. 7 is a schematic circuit diagram of the instruction control unit in FIG. 5;

FIG. 8A is a timing chart of the operations of the processor in FIG. 5;

FIG. 8B shows an example of a FORTRAN program for use in the explanation of the timing chart in FIG. 8A;

FIG. 8C shows an example of a vector instruction series for running the program in FIG. 8B.

DESCRIPTION OF THE PREFERRED EMBODIMENT

Before the detailed description of an embodiment is set forth, the principle of the present invention will be explained.

Figure 3:
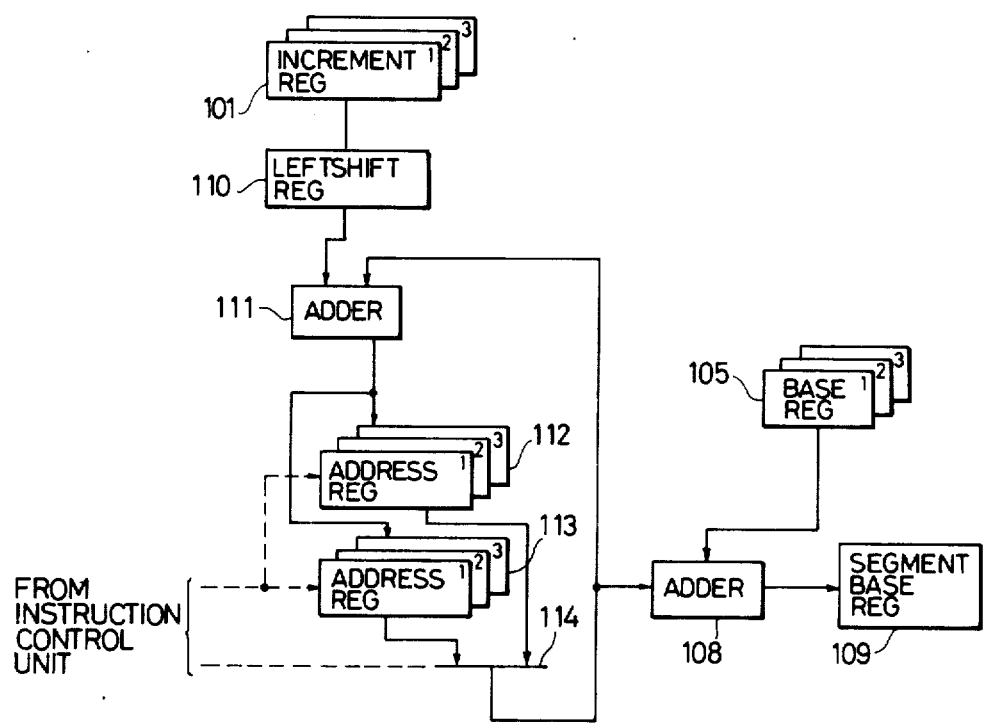
FIG. 3 is diagram for explaining the principle of the present invention.

FIG. 3 shows the conceptual arrangement of the present invention. Numeral 111 designates an adder, numerals 112 and 113 address registers, numeral 114 a selector, and numeral 110 a leftshift register. In addition, there are provided increment registers 101, an adder 108, a segment base register 109 and base registers 105.

Figure 1:
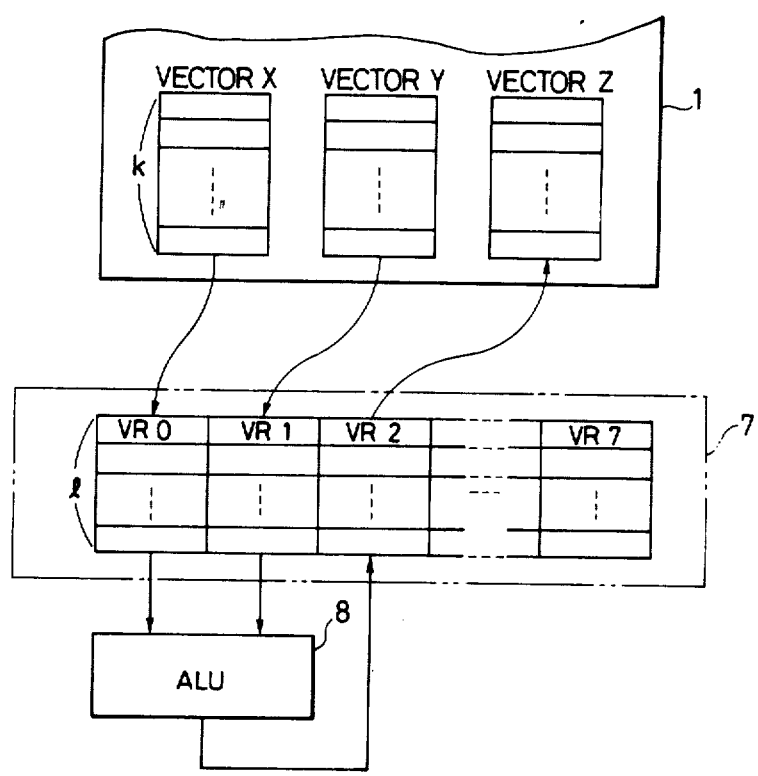
FIG. 1 is a schematic diagram of a prior-art vector processor.
Figure 2A:
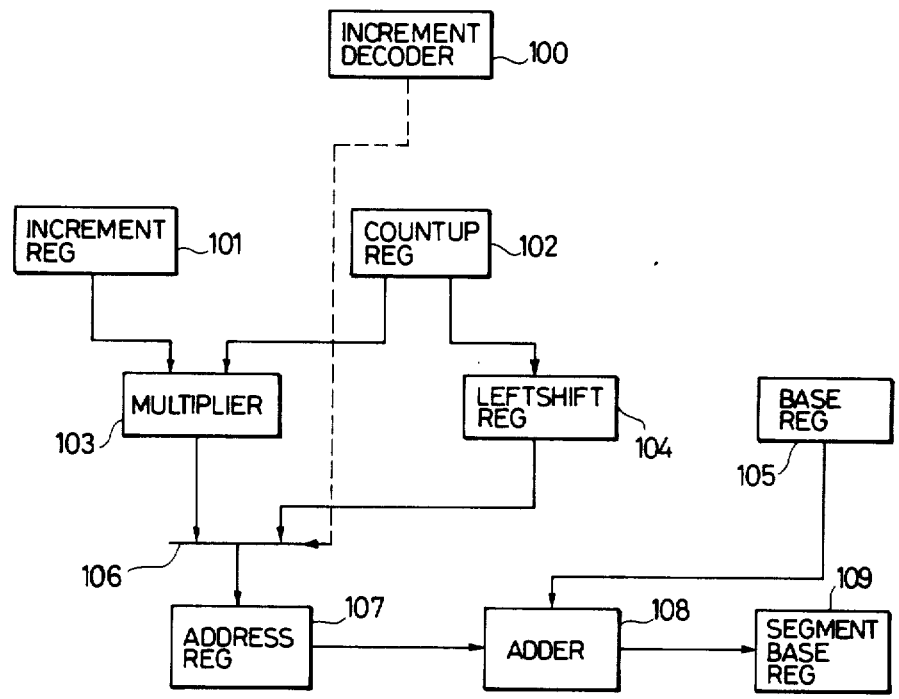
FIG. 2A is a block diagram showing an example of a known vector fetch circuit.
Figure 2B:
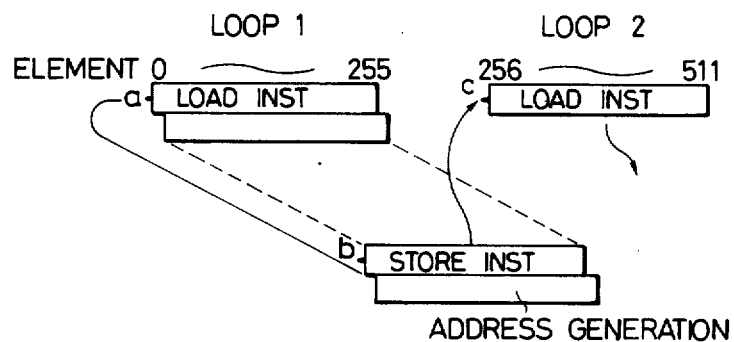
FIG. 2B is a diagram for explaining an instruction run sequence as performed by the circuit of FIG. 2A.

First, a base address is set in, e.g., the No. 1 register of the base registers 105; an increment value is set in, e.g., the No. 1 register of the increment registers 101; and e.g., the No. 1 register of the address registers 112 is reset to zero. Referring to the processing flow in FIG. 2B, the procedure for generating an address will be described below.

When the load instruction of a loop 1 is started, the value of the No. 1 register of the address registers 112 is inputted to the adder 108 through the selector 114 and is added to the value of the No. 1 register of the base registers 105. The added result is set in the segment base register 109, the value of which is transmitted to a memory requestor (not shown).

In parallel with this processing, the value of the No. 1 register of the increment registers 101 is shifted leftwards by 8 bits by means of the leftshift register 110, thereby to multiply the increment value by 256. This shift result is inputted to the adder 111. The other input of the adder 111 is supplied with the value of the No. 1 register of the address registers 112 through the selector 114, and the added result, namely, a segment address displacement is set in the No. 1 register of the address registers 113. Thus, the segment address displacement for use in the load instruction of a loop 2 is prepared in the No. 1 register of the address registers 113 in advance.

Next, address generation for the store instruction of the loop 1 is carried out by a processing procedure similar to that of the load instruction of the loop 1 described above. By way of example, the register Number to be used is assumed to be 2.

As soon as the store instruction at the last step of the loop 1 has been started, the load instruction for the loop 2 can be started. The reason is that the segment address displacement necessary for running the load instruction is already set in the No. 1 register of the address registers 113, and this displacement is applied through the selector 114 and registers 105 in the adder 108, whereby a segment base address for the load instruction is obtained. In this way, the overhead of the address generation at the change-over of the loop processing can be shortened.

When the load instruction of the loop 2 is started, the segment base address for the load instruction is obtained as stated above and is set in the segment base register 109, following which it is transmitted to a requester. In parallel therewith, the value of the No. 1 register of the increment registers 101 a multiplied by 256 is added to the value of the No. 1 register of the address registers 113 similarly to the processing in the loop 1, and the added result is set in the No. 1 register of the address registers 112 so as to provide a value for use in loop 3.

Thenceforth, such processing is similarly repeated a number of times according to the number of loops. Each time, the address registers 112 and 113 need to be controlled so as to be alternately used. Information as to the register number for the control of this vector processing is transmitted from an instruction control unit.

If the increment values are equal in the load instruction and the store instruction mentioned above, it is desirable to assign registers of identical number to the increment register 101 and address registers 112, 113 in these instructions. When the registers of identical number can be shared among the different instructions in this manner, there are the advantages that the period of time for setting the initial values can be shortened and a limited number of registers can be effectively utilized.

For example, even when the No. 1 register is used for the increment register 101 and address registers 112, 113 in the aforementioned store instruction, no problem results. Although the same value as the value set in the No. 1 register of the address registers 113 in the load instruction of the loop is set in this register again in the store instruction of the loop 1, there is no particular inconvenience.

While the address registers are disposed in two groups 112 and 113, they are necessary for sharing the identical address register number between different instructions. If the identical register number is not shared, one group suffices.

Figure 4A:
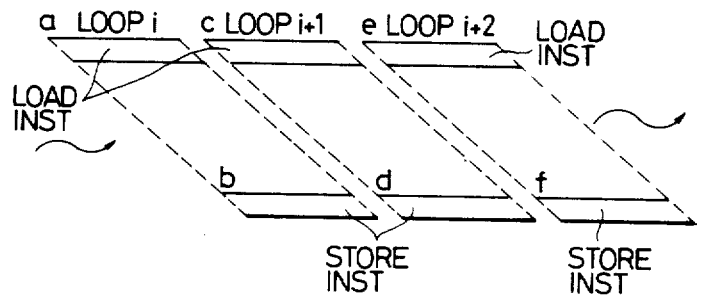
FIGS. 4A and 4B are diagrams for explaining examples of instruction run sequences according to the present invention under conditions differing from each other.
Figure 4B:
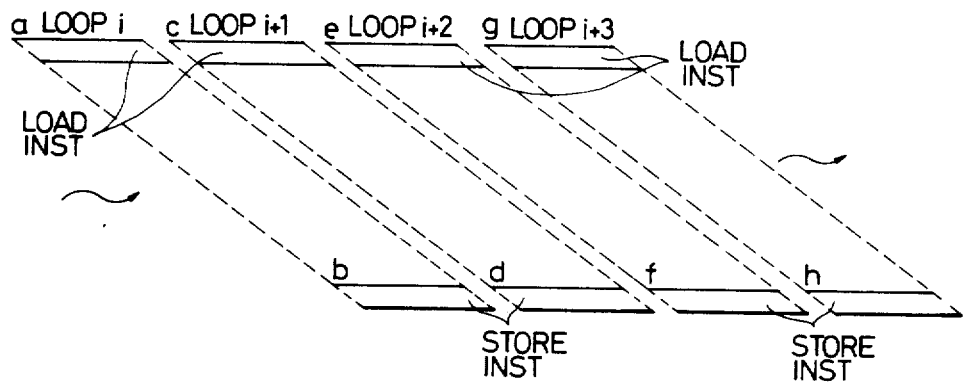

FIGS. 4A and 4B show processing flows in the case where the starting points of time of instructions overlap between or among loop processing operations.

FIG. 4A illustrates that the starting point of time e of the load instruction of a loop i+2 precedes the starting point of time d of the store instruction of a loop i+1, and that the starting point of time b of the store instruction of a loop i precedes the starting point of time e of the load instruction of the loop i+2. That is, the overlap of the starting points of time of the instructions occurs only between two adjacent loops when a certain point of time is taken. FIG. 4B illustrates that the starting point of time g of the load instruction of a loop i+3 precedes the starting point of time d of the store instruction of the loop i+1, and that the starting point of time b of the store instruction of the loop i precedes the starting point of time g of the load instruction of the loop i+3, so the starting points of time overlap among the three successive loops.

In order to perform the overlap processing of the instruction starting points of time between the loops and at the same time share the address registers between the different instructions, the two groups of address registers 112 and 113 shown in FIG. 3 are insufficient, so that still more registers need to be used. Three groups are required for the processing shown in FIG. 4A, and four groups are required for the processing shown in FIG. 4B.

In general, in order to effect an overlapping among n successive loop processing operations, n+1 groups of address registers are required. When the degree of overlap is deepened in this manner, the resources of an arithmetic logic unit or the like can be used continuously, and accordingly, an enhancement in the processing performance can be expected.

Figure 5:
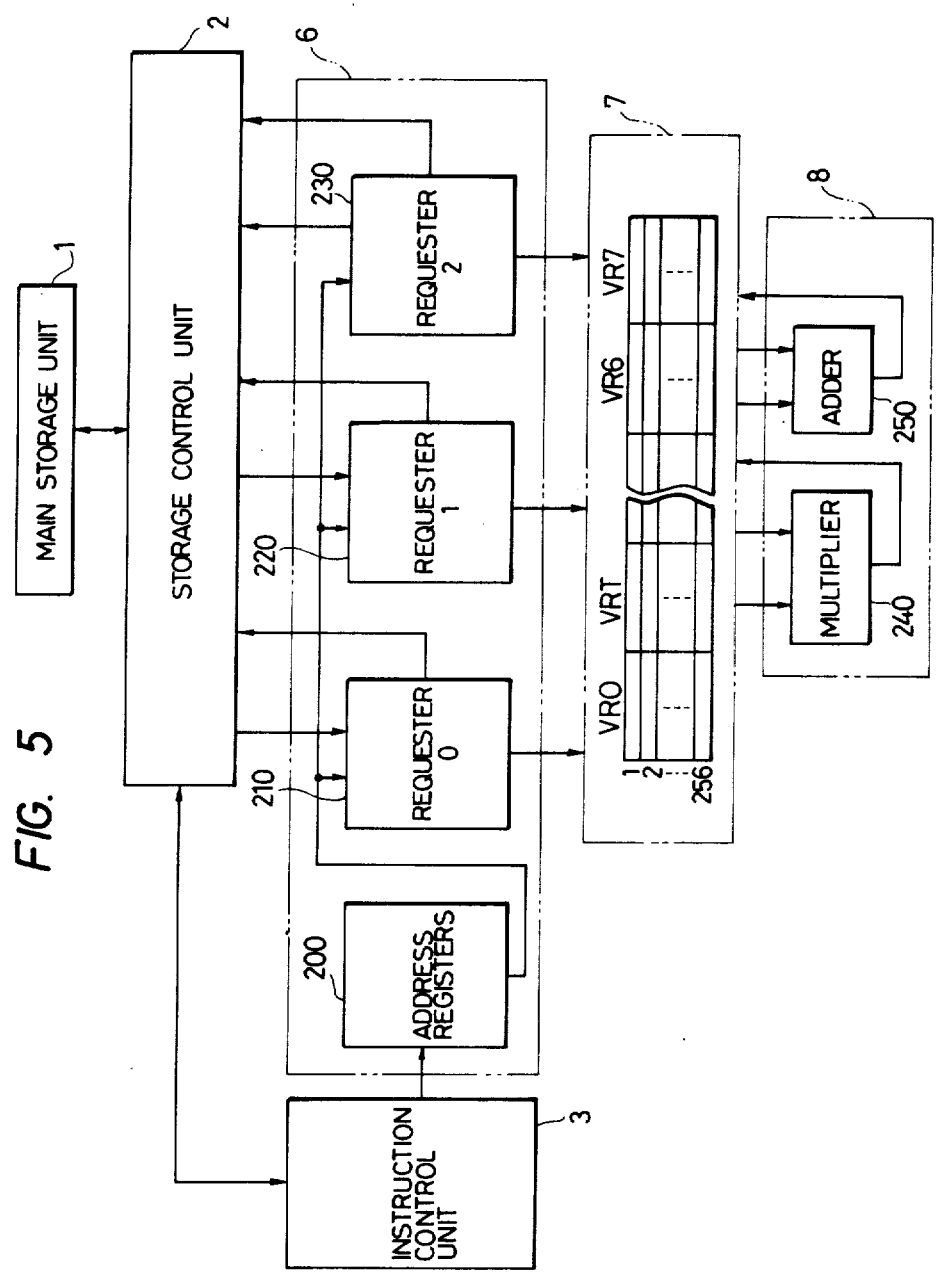
FIG. 5 is a schematic block diagram of a vector processor in accordance with an embodiment of the present invention.

FIG. 5 is a schematic block diagram showing an embodiment of the present invention. Numeral 1 designates a main storage unit which stores vector data, numeral 2 identifies a storage control unit which relays the command for fetch of the vector data from and for store thereof into the main storage unit 1, numeral 3 identifies an instruction control unit which decodes instructions and performs gating controls for various elements of the system (for example, an arithmetic logic unit, memory requesters, etc.), numeral 6 identifies an access control unit which is constructed of address registers 200, two fetch-only requesters 210, 220 (called "requesters 0, 1" respectively) and one store-only requester 230 (called "requester 2"), numeral 7 identifies a vector register unit which is constructed of eight vector registers VR0-7 (vector register length: 256), and numeral 8 identifies an arithmetic logic unit which is constructed of a multiplier 240 and an adder 250.

Figure 6:
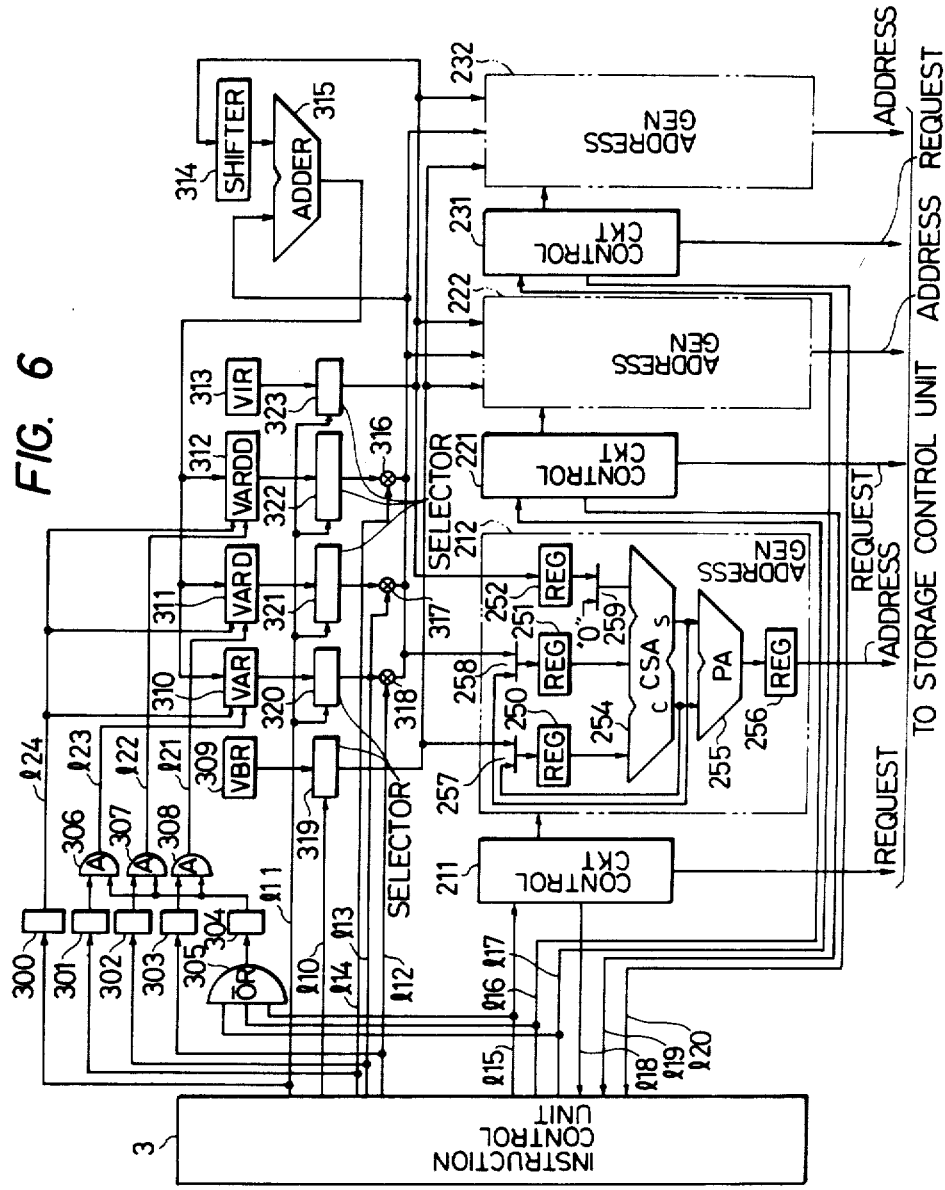
FIG. 6 is a schematic circuit diagram of the essential portions of the vector processor in FIG. 5.

FIG. 6 is a schematic circuit diagram of an address generating portion in the access control unit 6. Numerals 211, 221 and 231 indicate control circuits which control the beginnings and ends of operations and which are disposed in the requesters 0, 1 and 2, respectively; numerals 212, 222 and 232 identify address generating circuits which are disposed in the requesters 0, 1 and 2, respectively; numerals 300–304 identify registers; numeral 305 identifies an OR circuit; numerals 306–308 identify AND circuits; numeral 309 identifies vector base registers VBR; numerals 310–312 identify vector address registers VAR, VARD and VARDD, respectively; numeral 313 identifies vector increment registers VIR; numeral 314 identifies a leftshifter circuit; numeral 315 identifies an adder; numerals 316–318 identify gates; and numerals 319–323 identify selectors. Each of the register groups VBR 309, VAR 310, VARD 311, VARDD 312 and VIR 313 is composed of eight registers, and the second register of the register group VBR, for example, shall hereinbelow be denoted by "VBR2" for the sake of brevity.

The address of a vector X(i) is generated as follows:

| X(1) | $VBR_j + VAR_k$ |
| X(2) | $VBR_j + VAR_k + VIR_k$ |
| X(3) | $VBR_j + VAR_k + VIR_k * 2$ |
| X(i) | $VBR_j + VAR_k + VIR_k * (i - 1)$ |

It is assumed here that the Nos. j and k of the register groups VBR and VAR are assigned by an instruction and that the number of the VIR register assigned by an instruction will be the same as the number k of the VAR register.

The above address generation is effected by the address generating circuits 212, 222 and 232.

It is the VAR 310 and VARD 311 in FIG. 6 that correspond to the address registers 112 and 113 in FIG. 3. Further, the VARDD 312 is additionally provided in order to permit overlap between two loop processings.

FIG. 7 is a schematic circuit diagram of the instruction control unit 3. Numerals 400, 404 and 405 indicate gates; numeral 401 indicates an instruction register; numeral 402 indicates an instruction decoder circuit; numeral 403 indicate a loop register; numeral 406 indicates a decode suppression detector circuit; numeral 407 indicates an instruction queue register; numeral 408 indicates a loop queue register; numeral 409 indicates an instruction gating circuit; numeral 410 indicates a resource management circuit; numeral 411 indicates a decoder; and numeral 412 indicates a selector.

An instruction is fetched, and is inputted to the instruction decoder circuit 402 through the gate 400 and by way of the instruction register 401. Here, the instruction is decoded to provide the identifying information (OP code of the instruction and the information which designates the respective numbers of the VBR, VAR and vector registers, etc., which information is transmitted to the instruction gating circuit 409 through the gate 404. The instruction gating circuit 409 is supplied with the instruction decode information sent through the gate 404 from the instruction decoder circuit 402 and instruction decode information stored in the instruction queue register 407. It judges whether or not instructions having this decode information include startable instructions, and this determination is made on the basis of the statuses of use of the system components as transmitted from the resource management circuit 410. If there are startable instructions, it selects one from among them. If the instruction inputted directly from the instruction decoder circuit 402 cannot be started, the decode information corresponding thereto is queued in the next available vacant area of the instruction queue register 407. When both a certain instruction in the instruction queue register 407 and the instruction decoded by the instruction decoder circuit 402 can be started, the instruction in the instruction queue register 407 is preferentially started. When there are a plurality of startable instructions in the instruction queue register 407, they are started in succession from the earliest decoded one.

The resource management circuit 410 manages the status of use of the various components (such as the memory requesters and the arithmetic logic unit). Those components associated with the instruction started on the basis of the outputs supplied from the instruction gating circuit 409 are deemed "in use" by the circuit 410. When end signals (for example, 118-120 for the memory requesters 0-2) from the components are transmitted to the circuit 410, the corresponding components are deemed "not in use".

In the above way, the startable instructions are started immediately, and the unstartable ones are queued until they become startable. Such a system has already been disclosed in Japanese patent application No. 56-210392, and shall not be described further in detail. In the embodiment of the present invention, loop information is added anew, and the control is performed as follows. The loop register 403 has a capacity of 2 bits. It is set at one before the processing of a vector instruction series is started, and the instruction decoder circuit 402 increments the value of the loop register 403 by +1 each time it decodes an END instruction located at the last step of the instruction series. However, when the value in the loop register 403 becomes zero, it is automatically set to the value one. Values 1, 2 and 3 which correspond to the address registers VAR, VARD and VARDD, respectively, are therefore generated in respective cycles by the loop register 403, and when the load or store instruction is run, the corresponding address registers are selected on the basis of these values. The loop information of the loop register 403 is transmitted through the gate 405 to the selector 412 directly in synchronism with the information outputted from the instruction decoder circuit 402, or is supplied thereto after having been once queued in the loop queue register 408.

In the case where the instruction which is found to be startable by the instruction gating circuit 409 is the load or store instruction, the loop information consisting of the 2 bits from the register 403 corresponding to this instruction is selected by the selector 412 and is thereafter decoded by the decoder 411. When the loop information is 1, 2 or 3, a line 112, 113 or 114 is turned "on" respectively.

In the case where the instruction found to be startable and selected is the load instruction or store instruction, the instruction gating circuit 409 transmits the identity of the requesters to be used, through lines 15-17 when the requester 0, 1 or 2 is to be used, the circuit 409 delivers a start signal to the line 115, 116 or 117, respectively. In addition, the instruction gating circuit 409 delivers the base register number and address register number from the decode information of the selected instruction to lines 110 and 111, respectively.

Needless to say, the instruction is fetched by a circuit (not shown) in the storage control unit 2 which repeatedly fetches an instruction series for loop processing until data of a desired vector length has been processed, as taught in Japanese patent application No. 55-9874 entitled "Vector Processor". Of course, this circuit includes a circuit (not shown) which determines the repetition number required for the instruction fetch on the basis of the vector length as well as the vector register length and the number of elements processed until then.

In the block diagram of the access control unit 6 in FIG. 6, three groups of address registers VAR, VARD and VARDD are provided. Therefore, overlapping is allowed up to two successive loops, as seen in FIG. 4A, and any other overlap needs to be suppressed. In this regard, control is performed as follows.

The decode suppression detector circuit 406 is supplied with the loop information from the loop register 403 and the loop queue register 408, and it delivers suppression signals in the ensuing cases so as to disable the gates 400, 404 and 405 and to suppress new instruction decoding.

Case 1: The value of the loop register 403 is "01", and "10" exists in the loop queue register 408.

Case 2: The value of the loop register 403 is "10", and "11" exists in the loop queue register 408.

Case 3: The value of the loop register 403 is "11", and "01" exists in the loop queue register 408.

Naturally, the suppression signal is also delivered in a case where the instruction queue register 407 has been filled. In this manner, overlap of the loop processing can be controlled in response to the loop information.

An example of vector processing which employs the present embodiment is shown in FIG. 8A. The processing example corresponds to an operation in which, as shown in FIG. 8B, a vector D(i) is added to the product between vectors B(i) and C(i), the result being a vector A(i). In actuality, the operation is developed for the processing into an instruction series as shown in FIG. 8C by way of example. In the following, the processing steps will be detailed in conjunction with the processing example of FIGS. 8A-8C.

Instruction 1 is an instruction which loads a vector B from the main storage unit 1 into the vector register VR0. That is, this instruction requires the processing of fetching vector data from the main storage unit 1 on the basis of a segment base address obtained by adding the contents of the VAR1 and VBRI, and then storing the fetched data into the vector register VR0.

It is assumed that the address information of the vector B is stored in the registers VBR1, VAR1 and VIR1 in advance. The registers VIR are assumed to have the same register numbers as those of the assigned registers VAR.

Upon decoding Instruction 1, the instruction control unit 3 delivers start signal to the control circuit 211 of the requester 0 by the use of the signal line 115. Simultaneously, it delivers information from VBR No. 1 through the selector 319 by enabling the signal line 110, and information from VAR No. 1 and VIR No. 1 through the selectors 320 and 323 by enabling the signal line 111. The selector 319 passes the output of VBR1, and the selector 323 passes the output of VIR1, to the address generator circuit 212. The selectors 320–322 select VAR1, VARDI and VARDDI, respectively. Since, however, the instruction control unit 3 turns "on" only the line 112 among the lines 112–114 for the processing of Loop 1, the output of VAR1 is delivered to the address generator circuit 212 through the gate 318. On the basis of this address information, the address generator circuit 212 generates the addresses of the respective elements of a vector A successively for 256 elements in synchronism with a clock and delivers them to the storage control unit 2 together with a request signal delivered from the control circuit 211.

In response to the start signal on the line 115, the control circuit 211 controls the selector 257 to set the output of VBRI in the register 250 and controls the selector 258 to set the output of VAR1 in the register 25 and to set the output of VIRI in the register 252. Further, it controls the selector 259 to initially apply 0 (zero) to a carry save adder 254. This adder and a parallel adder 255 calculate the address of the first element B(1) of the vector B, to set it in a register 256. Thereafter, the control circuit 211 sets the carry output C and sum output S of the carry save adder 254 in the registers 250 and 251 through the selectors 257 and 258, respectively. Further, it controls the selector 259 to input the increment value in the register 252 into the adder 254. As a result, the address of the next element B(2) is calculated by the parallel adder 255 and is set in the register 256. Thenceforth, the addresses of the elements B(3), . . . . B(256) are similarly calculated successively in synchronism with the clock. The control circuit 211 delivers a memory request to the storage control unit 2 in synchronism with the setting of each address in the register 256. This control circuit 211 receives the number of elements to be processed (256 in this example) from the instruction control unit 3, simultaneously with receiving the start signal, and controls the number of times of issue of the memory requests on the basis of the received number of elements.

At the same time that the outputs of VAR1 and VIR1 are transmitted to the address generator circuit 212, the output of VAR1 is inputted to the adder 315, and the output of VIR1 is shifted leftwards by 8 bits by means of the leftshifter 314 (that is, VIR1 * 256) and then inputted to the adder 315, whereupon both the values are added.

The added result represents a segment address displacement for use in the processing of Loop 2. It is set in VARD1. A setting signal for VARD at this time is prepared as stated below.

The start signal delivered through the signal line 115 is set in the register 304 through the OR circuit 305, while at the same time the ON signal delivered to the signal line 112 is set in the register 303. These signals are inputted to the AND circuit 308, the output signal of which delivered through a signal line 121 as the setting signal for VARD. As the register No. of VARD, the VAR No. delivered from the signal line 111 is sent through the register 300 as well as a signal line 124. In this way, the segment address displacement for use in the processing of Loop 2 is set in the VARD1 in advance.

When the setting in VARD1 in Instruction 1 has ended one cycle after the start of Instruction 1, the next instruction 2 is started.

Instruction 2 is an instruction which loads a vector C into the vector register VR1.

The instruction control unit 3 delivers a start signal to the control circuit 221 of the requester 1 by the use of the signal line 116. Simultaneously, as in the processing in Instruction 1, it delivers VBR number "2" through the signal line 110, VAR and VIR numbers "2" through the signal line 111, and an ON signal through the signal line 112. At the same time when the output of VBR 2, VAR 2 and VIR 2 are transmitted to the address generator circuit 222, the outputs of VAR 2 and VIR 2 are transmitted to the adder 315, and the added result (VARI +VIR1*256) is set in VARD 2.

By starting Instructions 1 and 2, vectors B and C are fetched successively in the earliest order of the elements and are respectively stored in the vector registers VR0 and VR1. Upon arrival of the data, a multiplication assigned by Instruction 3 is successively executed by the multiplier 240, and the result is stored in the vector register VR2.

Instruction 4 is an instruction which loads a vector D from the main storage unit 1 into the vector register VR3. However, since the fetch-only requesters 0 and 1 are in use, the operation needs to wait until either requester becomes vacant before starting this instruction. During the wait time, the instruction control unit 3 decodes the subsequent instruction. Since Instruction 5 utilizes the vector register VR3 in which the operated result in Instruction 4 is stored, this instruction 5 cannot be started earlier than the instruction 4. Further, since Instruction 6 is the instruction for storing the operated result of Instruction 5 in the main storage unit, it cannot be started either. Accordingly, the decoded information of Instructions 4–6 is queued in the instruction queue register 407 (FIG. 7). Thereafter, the END instruction (Instruction 7) located at the last of the instruction series is decoded, and whether the next loop processing is necessary or unnecessary is decided. Now, since the vector register length is 256 and the vector length is 500, the processing of Loop 2 becomes necessary. Further, for the processing of Loop 2 becomes necessary. Further, for the processing of Loop 2, Instructions 1, 2 . . . are also decoded and queued.

When the requester 0 has ended its processing of Instruction 1, the control circuit 211 delivers the end signal to the instruction control unit 3 through the signal line 118. Upon receiving this end signal, the instruction control unit 3 judges the possibility of starting Instruction 4 and applies this start to the requester 0.

The starting method is similar to the case of Instruction 1. The outputs of VBR3, VAR1 and VIR1 are delivered to the address generator circuit 212. Simultaneously, the outputs of VAR 1 and VIR 1 are delivered to the adder 315, and the added result (that is VAR 1+VIR 1*256) is set in VARD1.

When, owing to the run of Instruction 4, the vector D has been fetched and stored in the vector register VR3, Instruction 5 which effects the addition between the information in VR2 and VR3 is run. Meanwhile, the instruction control unit 3 receives the end signal through the signal line 119 from the control circuit 221 and then applies the start of Instruction 1 of Loop 2 to the requester 1. The outputs of VBR1, VARD1 and VIR1 are transmitted to the address generator circuit 222, and simultaneously, VARD1+VIR1 * 256 is calculated and set in VARDD1. In this case, the signal line 113 turns ON, so that a setting signal is transmitted to VARDD through the signal line 122.

Next, when the first elements of VR2 and VR3 have been added by the adder 250 and the result has been stored in VR4, Instruction 6 is initiated.

The start of Instruction 6 is applied to the requester 2 through the signal line 120. The outputs of VBR4, VAR1 and VIR1 are transmitted to the address generator circuit 232 simultaneously, VAR1 +VIR1*256 is calculated and set in VARD1. Here, the start of Instruction 1 of Loop 2 precedes in time that of Instruction 6 of Loop 1, and the VAR is shared, but the address generation is properly carried out. More specifically, when Instruction 1 of Loop 2 is started, the output of VARD1 is used, and a value to be used in Loop 3 (the present processing example ends in Loop 2, but the existence of Loop 3 is assumed) is set in VARDD1. The value of VAR1 is not updated, and Instruction 6 of Loop 1 to be started later uses the information in VAR1, so that no contradiction arises.

Thenceforth, the processing proceeds similarly. Instruction 2 of Loop 2 is started after the end of the operation of requester 0, and Instruction 4 of Loop 2 is started after the end of operation of the requester 1. In the case where the processing of a Loop 3 is required, the address selection and setting at the start of Instruction 1 of Loop 3 are performed as follows. The outputs of VBR1, VARDD1 and VIR1 are selected and transmitted to the address generator circuit 212. Simultaneously, the outputs of VARDD1 and VIR1 are transmitted to the adder 315, and the added result (that is, VARDD1+VIR1*256) is set in VAR1. At this time, the signal line 114 turns ON, and the setting signal is transmitted to VAR through the signal line 123.

Figure 9:
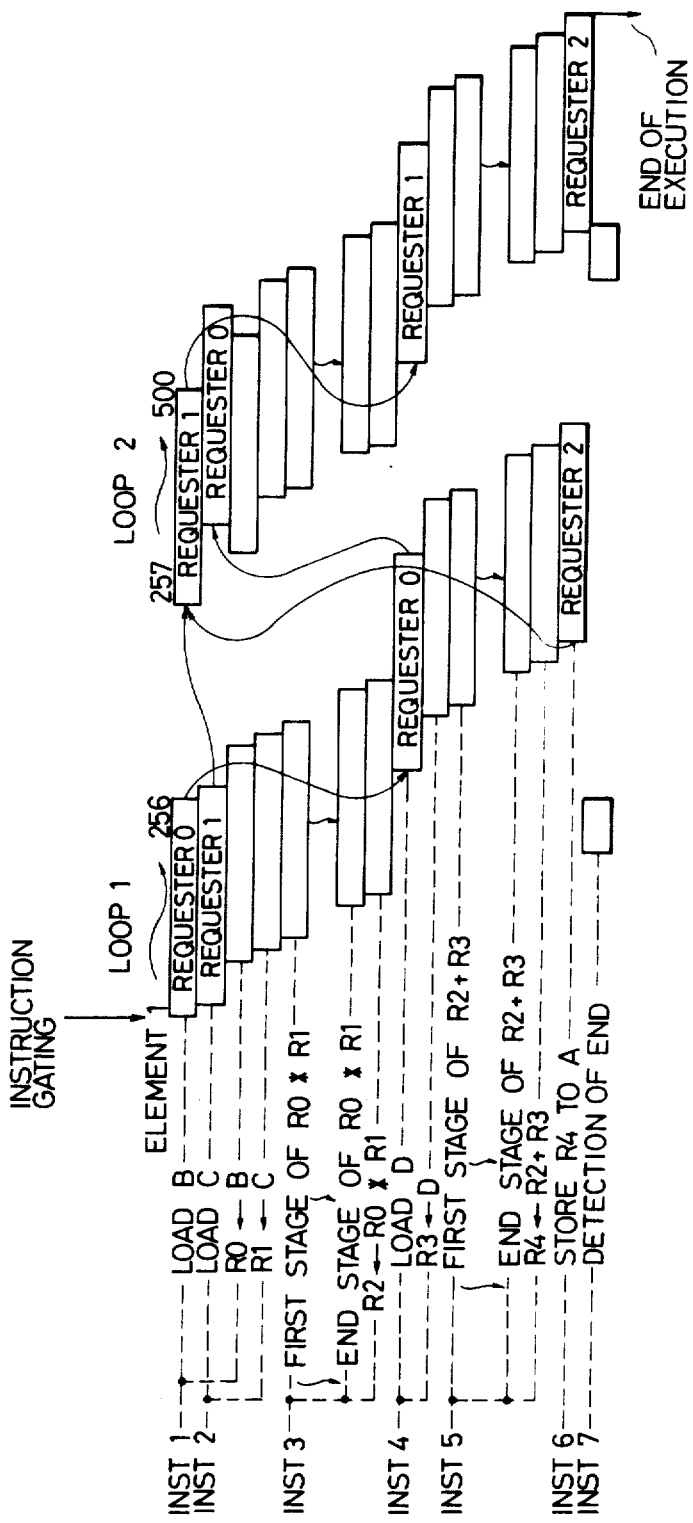
FIG. 9 is a timing chart of the operations of the processor in FIG. 5 concerning a vector instruction series different from that in FIG. 8C.

FIG. 9 shows the processing flow in the case of performing vector processing similar to that shown in FIGS. 8A-8C. In this case, it is assumed that the registers VARDD are not provided in the arrangement of the access control unit 6 in FIG. 6. When the processing of FIG. 9 is compared with that of FIG. 8A-8C, clearly the efficiencies of use of the requesters 0 and 1 are inferior, and the processing performance degrades. Thus, the effect of the overlap between the loop processing is evidently noted.

As thusfar described, according to the present invention, address information required for loop processing in a later loop than the current loop processing is provided during the run of the current loop processing, so that the next loop processing can be initiated as soon as the current loop processing has ended. Moreover, in a case where an unstartable instruction exists in the current loop processing and where a startable instruction exists in the next loop processing, the next loop processing can be initiated with out waiting for the end of the current loop processing.

We claim:

1. A vector processor, comprising:
    (a) a memory for storing sets of vector elements and instructions;
    (b) a plurality of vector registers connected to said memory, each vector register being capable of holding a predetermined number of vector elements;
    (c) arithmetic means connected to said vector registers for executing an operation on vector elements read out of one of said vector registers and for providing another one of said vector registers with vector elements corresponding to the result of execution of the operation;
    (d) control means connected to said memory for controlling execution of instructions stored in said memory, including means for repeatedly fetching and decoding an instruction series so that the instruction series is executed repeatedly, and means for detecting the number of times of repetition of decoding of respective instructions of the series when the respective instructions of the series are decoded repeatedly;
    (e) a plurality of base registers each for holding an applied base address which is equal to an address of a starting vector element of a set of vector elements among the sets of vector elements held by said memory;
    (f) a plurality of groups of address registers, respective groups of said address registers being provided in correspondence to different repetition numbers j of the instruction series and having the same number of address registers, the first group of address registers respectively holding applied segment address displacements for first segments of groups of vector elements whose transfer between said memory and said vector registers are respectively required by transfer requiring instructions, each segment address displacement for a first segment of a group of vector elements indicating the address difference between an address of a starting vector element of the group of vector elements and a base address of a set of vector elements including the group of vector elements;
    (g) a plurality of increment registers each for holding address increment data indicative of an address difference between two adjacent vector elements of a group of vector elements among said groups of vector elements;
    (h) said control means further including:
        (h1) read means, connected to said plurality of groups of address registers and responsive to the start of execution of one of the transfer requiring instructions by said control means and to a repetition number j detected for the one instruction thereby, for reading out a base address for a set of vector elements which includes a group of vector elements whose transfer is required by the one instruction from a base register designated by the one instruction, for reading out address data as a j-th segment address displacement from an address register designated by the one instruction within a group of address registers corresponding to the detected repetition number j and for reading out address increment data from an increment register designated by the one instruction;
        (h2) operation means connected to said read means for multiplying the read out address increment data by a predetermined number indicative of a total number of the vector elements included in each segment and for adding the result of the multiplying to the address data read out by said read means so as to provide resultant data of the addition as a segment address displacement of a (j+1) segment of the group of vector elements;

(h3) write means connected to said operation means and responsive to the one instruction for writing the segment address displacement for the J+1) segment provided by said operation means into an address register designated by the one instruction within a group of address registers corresponding to a repetition number J+1 next to said detected repetition number j;

(i) address means connected to said read means for sequentially generating addresses for the j-th segment of the group of vector elements by repeatedly adding the read out address increment data to the sum of the read out base address and the read out segment address displacement and for accessing said memory with the generated addresses so as to transfer the j-th segment of the group of vector elements.

2. A vector processor according to claim 1, wherein said detecting means detects the number of repetitions with a modulus being a number n of all the address register groups, and said write means includes means for performing the writing of the (j+1)-th segment address displacement into the first address register group as the (n+1)-th address register group when j is equal to n.

3. A vector processor according to claim 1, wherein n groups of address registers are provided, and said read means includes means for reading the address data from the (j−n1)-th address register group as the j−th address register group when the number j of repetition has exceeded n1, and said write means includes means for performing the writing of the j+1)-th segment address displacement to the (j+1−n1)-th address register group as the (j+1)-th address register group when (j+1) has exceeded n1, where 1 is a positive integer.

4. A vector processor according to claim 1, wherein said control means further includes:

an instruction queue register connected to said fetching and decoding means for holding decoded information and a number of repetition relating instructions which are judged as being executable at times of decoding of respective instructions;

judge means connected to said fetching and decoding means and said instruction queue register for judging whether or not a currently decoded instruction or instructions held by said instruction queue registers are executable, on the basis that an instruction is executable when any means required by the instruction for execution thereof is available for use and no register conflict exists with an instruction decoded earlier than the instruction and lying in said instruction queue register, for providing decoded information of an executable instruction to said operation means or to said address means, for providing the number j of repetition detected for the executable instruction to said read means and said write means, thereby enabling the currently decoded instruction or an instruction held in said instruction queue register to be started earlier than one or plural other instructions held by the instruction queue register and decoded earlier than the instruction.

5. A vector data processor according to claim 4, said instruction control means further includes decode suppression means connected to said detecting means, said fetching and decoding means, and to said instruction queue register for detecting whether or not there is an instruction in said instruction queue register for which is detected a number of repetition of j-(n−1) is detected (where j is equal to or greater than n), when the number j is the number of repetition of a currently decoded instruction, and for suppressing transfer of decoded information of the currently decoded instruction to said instruction queue register and said judge means.

* * * * *